United States Patent [19]
Gautier

[11] Patent Number: 5,484,371
[45] Date of Patent: Jan. 16, 1996

[54] BALL AND SOCKET JOINT FOR INTERCONNECTING A CERAMIC ROLLER TO A BEARING

[75] Inventor: David Gautier, Maubeuge, France

[73] Assignee: Vesuvius France S.A., Feignies, France

[21] Appl. No.: 453,559

[22] Filed: May 26, 1995

Related U.S. Application Data

[63] Continuation of Ser. No. 204,678, Mar. 1, 1994, abandoned.

[30] Foreign Application Priority Data

Mar. 5, 1993 [FR] France ................................. 93 02761

[51] Int. Cl.⁶ ..................................................... B41F 31/02
[52] U.S. Cl. ................... 492/16; 492/27; 492/47
[58] Field of Search ................................. 492/16–20, 27, 492/47, 48, 57

[56] References Cited

U.S. PATENT DOCUMENTS 1,784,848  12/1930  Reichle .......................... 492/47
3,701,912  10/1972  Schulze .
4,229,950  10/1980  Fessender ..................... 492/47
4,452,141  6/1984   Mistyurik ...................... 492/47
5,151,737  9/1992   Johnson et al. ............... 355/211
5,177,867  1/1993   Danielsson .................... 492/27

FOREIGN PATENT DOCUMENTS 168534  3/1906  Germany ........................ 492/47
25489   8/1910  United Kingdom ........... 492/47

Primary Examiner—Irene Cuda
Attorney, Agent, or Firm—Sixbey, Friedman, Leedom & Ferguson

[57] ABSTRACT

A ceramic roller, including of a shell and a shaft passing through the shell characterized by at least one ball-and-socket joint between the shell and the shaft. At least one end cap is placed at an end of the shell and mounted on the shaft. A ball-and-socket joint is provided between the shell and the end caps or between the shaft and the end caps. The ball-and-socket joint is preferably obtained by the provision of an annular collar having a rounded cross section mounted between the truncated conical bearing surface of the shell and the end caps.

10 Claims, 3 Drawing Sheets

BALL AND SOCKET JOINT FOR INTERCONNECTING A CERAMIC ROLLER TO A BEARING

This application is a continuation of Ser. No. 08/204,678, filed Mar. 1, 1994, now abandoned.

BACKGROUND OF THE INVENTION

The invention generally concerns a roller mounted on bearings, and is specifically concerned with a ball and socket joint between the ceramic roller and the bearings for eliminating localized stresses that can cause the roller to chip.

Rollers designed to support loads such as a metal strip in a heat-treatment furnace in which the strip is to be annealed at a relatively high temperature are already known. Such rollers are comprised of a cylinder of ceramic refractory material. An end cap mounted rotatably on a bearing is fixed at each end of the ceramic cylinder. U.S. Pat. No. 4,399,598 describes a ceramic roller for transporting glass sheets through a heat treatment. The cylinder is mounted rotatably on bearings by means of end caps mounted with play at each end of the cylinder. One or more radially compressible split metal rings are placed in the space between the outside diameter of the cylinder and the inside diameter of the end cap. A roller of similar type is also disclosed in U.S. Pat. No. 4,404,011; it is comprised of a cylinder of refractory material at the ends to which metallic end caps are fixed. Play is provided between the end caps and the cylinder. Flat leaf springs are placed around the periphery of this play.

These known systems of the prior art make it possible to take up the differential expansion between the roller and the end caps when the roller is exposed to heat. When heated, the cylinder of refractory material expands practically not at all while, on the other hand, the metallic end caps expand greatly. The play between the cylinder and the end caps consequently varies substantially as a function of the temperature. This is why it is necessary to provide resilient devices in this space that prevent backlash from occurring between the end caps and roller over a broad range of temperature.

However, these prior art systems have the shortcoming of not assuring coaxially between the end caps and the cylinder under load. In effect, when the cylinder supports a load, the resilient devices, whether involving the split rings disclosed in U.S. Pat. No. 4,399,598 or the leaf springs of U.S. Pat. No. 4,404,011, are deformed such that the end caps are displaced angularly with respect to the axis of the cylinder, thus causing the cylinder of the roller to rotate eccentrically with respect to the bearings.

To remedy these disadvantages, a roller having an end cap with a conical joint was developed as shown in U.S. Pat. No. 5,096,061. It is comprised of a ceramic cylinder, e.g., a vitreous fused silica, at the end of which at least one end cap is mounted. The junction between the cylinder and the end cap is a conical connection. The cylinder can be solid or comprised of a shell traversed by a metal shaft. In this latter case the end caps are mounted on the metal shaft, at least one of the end caps being applied resiliently (e.g., by means of helicoidal springs) against one end of the shell.

A roller of this type remedies the disadvantages associated with the prior art and assures coaxially of the cylinder and the end caps under load. This coaxially is not affected when even an elevated load is applied on the roller. Nevertheless, a device of this type also presents a number of shortcomings. In theory, the contact between the end caps and the cylinder (solid or hollow) is made along a frustoconical area, i.e., the conical engagement area of the roller ends on the conical surfaces of the end caps. In practice, because the conical surfaces of the cylinder and the end caps cannot be perfectly complementary due to machining tolerances, the contact is made only along an elongated zone on all sides of a contact generatrix. This contact zone rotates around the circumference of the cylinder-end cap interface with the rotation of the roller. In other words, when the roller turns, the contact between the end caps and the ends of the cylinder is progressively made over the entire periphery of the circumference of the interface. The metal shaft is deformed under load. Consequently, the contact zone, already reduced to an elongated zone located along the generatrix due to machining tolerances, is transformed into a zone of point support. The contact pressure between the end caps and the roller then increases considerably until it exceeds that admissible limit for the ceramic forming the cylinder. This then lead to a chipping and/or fissuring of the ceramic.

SUMMARY OF THE INVENTION

The object of the present invention is a roller designed in a non-limiting manner for applications in the glass or metallurgical industries which remedies the shortcomings of the prior art.

The roller of the invention preserves a sufficient contact surface between the end caps and the cylindrical shell (or solid roller) despite the inevitable flexing of the shaft under load. A sufficient contact surface is understood to be a surface that is large enough so that the contact pressure between the materials never exceeds an admissible limiting value. Fissuring of the material constituting the shell, e.g., a ceramic material, is thus avoided; therefore, the service life of the installation is greatly increased.

These goals are achieved according to the present invention due to the fact that the roller is comprised of a shell of refractory material having two ends and a definite bearing surface at each of these ends, two end caps mounted rotatably on at least one shaft, and placed in the axis of the shell at each end and receiving the bearing surface of the shell, these end caps being of a material with a higher coefficient of expansion than that of the refractory material of the shell, and an essentially ball-and-socket joint between the roller bearings and each end of the cylindrical shell, the centers of these joints being different from each other.

Thanks to the spherical interface of the ball-and-socket joint, the area of the contact zone between the cylindrical shell and the end caps is not reduced when the shaft flexes under load. Likewise, no supplementary flexing load is imposed on the roller.

According to one embodiment, the shell is hollow and the roller has a shaft passing through said shell. Preferably, one of the end caps is mounted fixed on the shaft and the other is mounted axially sliding with respect to the shaft, with a resilient means such as a spring pressing the sliding end cap against the end of the cylindrical shell. The ball-and-socket joint or globe-and-socket joint may be provided between the ends of the cylindric shell and the end caps. In a second embodiment, the ball-and-socket joint can be provided between the shaft passing through the cylindrical shell and one or both of the end caps. In a third embodiment, the ball-and-socket joint is obtained by mounting an intermediate piece on a bearing surface, e.g., conical, of the shell between the shell and the end caps. This piece preferably has a small width and thickness relative to its diameter. Other

BRIEF DESCRIPTION OF THE SEVERAL DRAWINGS

Figure 4:
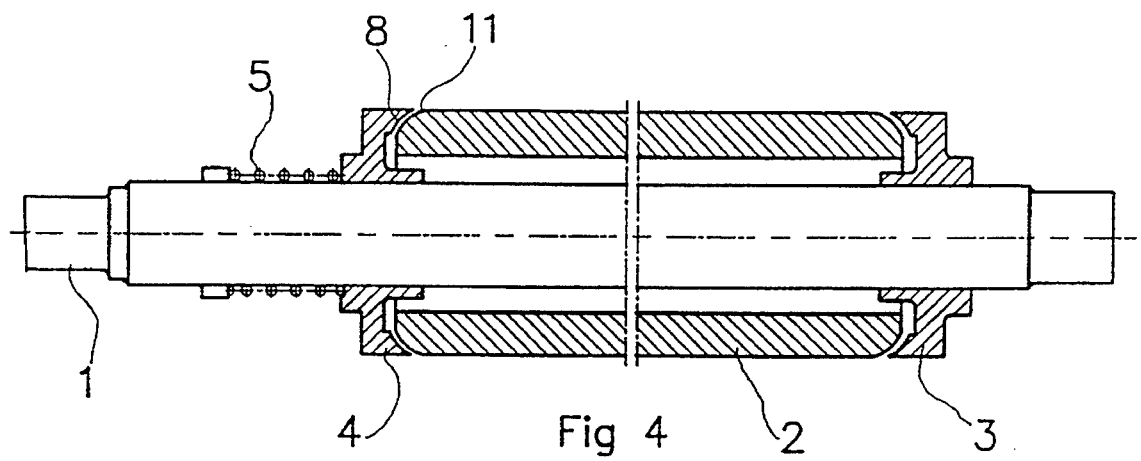
Figure 5:
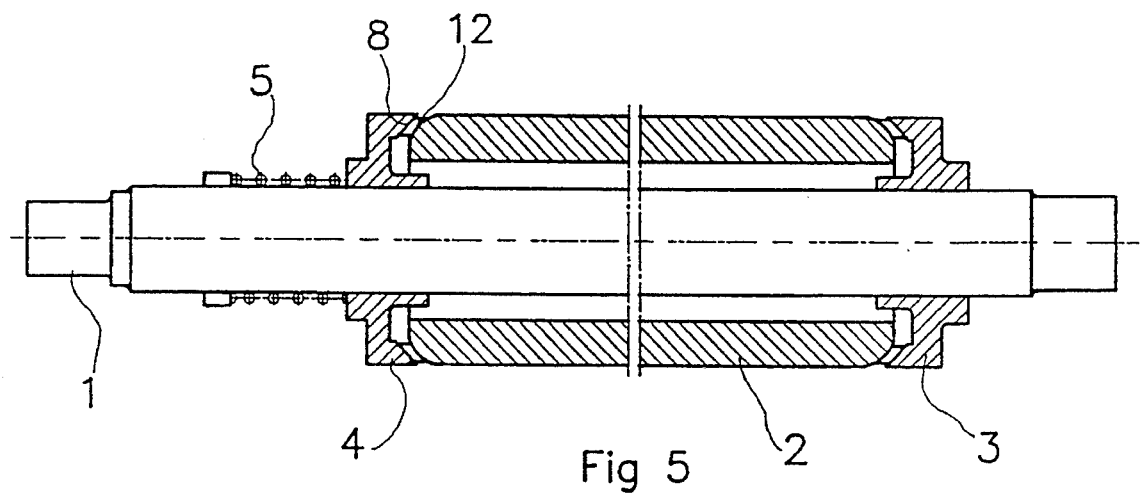
Figure 6:
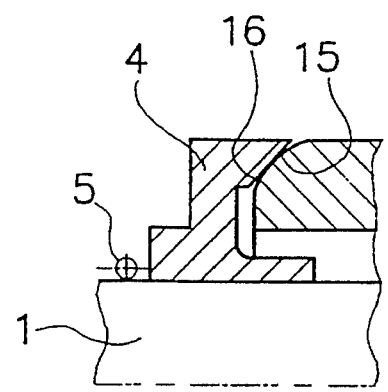
Figure 7:
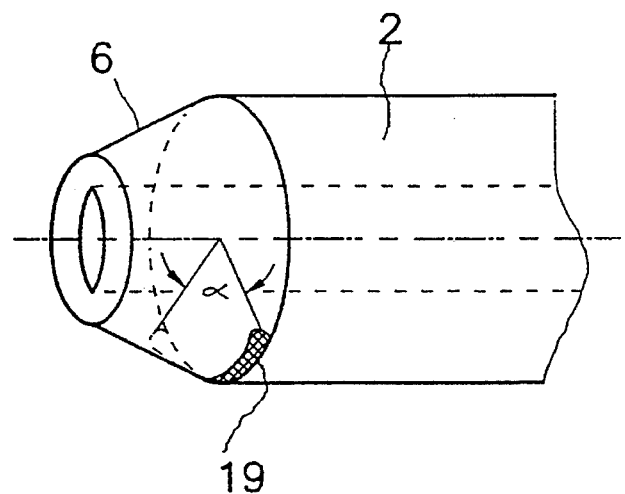
Figure 8:
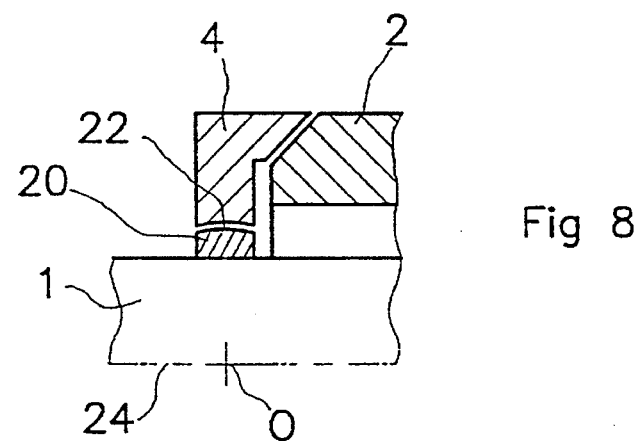
Figure 9:
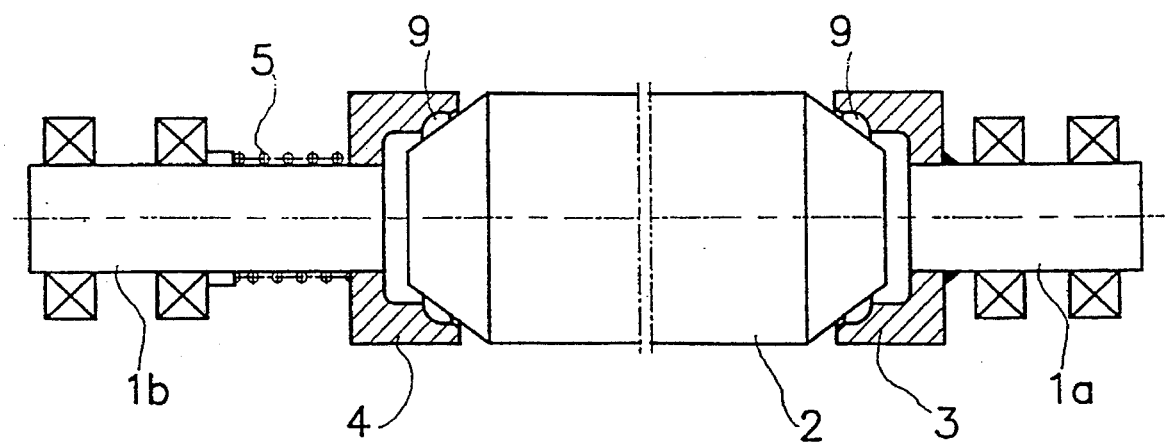

FIGS. 4, 5, and 6 are partial cutaway views of other embodiments of the present invention;

FIG. 7 is a perspective schematic perspective view that illustrates the contact zone between the shell and an end cap in the roller of the invention;

FIG. 8 is a partial cutaway view of still another embodiment in which the ball-and-socket joint is placed between the end cap and the shaft, and FIG. 9 illustrates another embodiment of the invention in which the cylindrical shell is solid.

DETAILED DESCRIPTION OF THE PREFERRED EMBODIMENT

Figure 1:
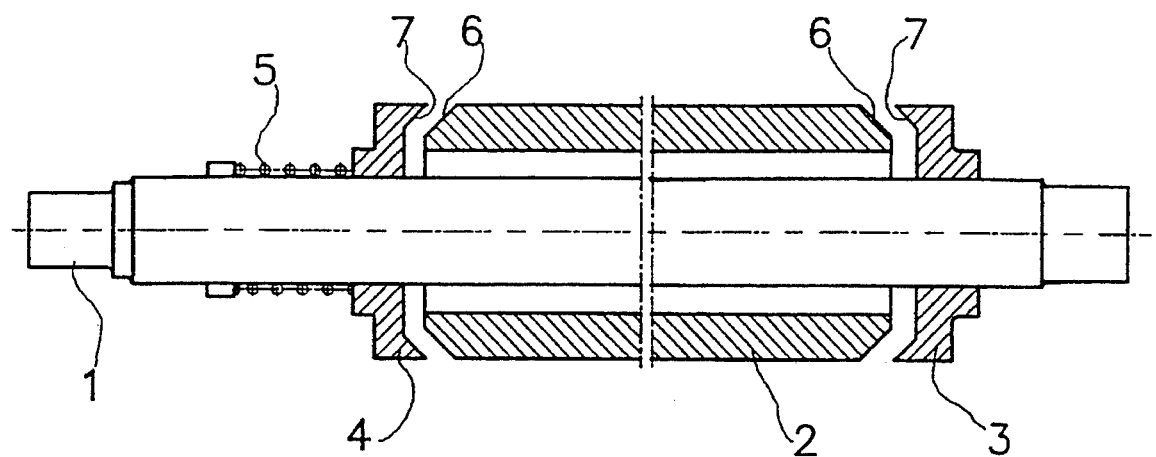
FIG. 1 is a partially cutaway schematic representation of a known prior art roller.

Reference 1 designates a shaft in FIG. 1. It passes through a generally cylindrical shell 2 of refractory material, e.g., a ceramic. An end cap, e.g., of metal 3 is mounted at one end of the shell 2. A second end cap 4 is mounted at the other end of the shell 2. In this prior art roller the end cap 3 is mounted fixed on the shaft. The end cap 4 is slidably mounted on the shaft I and a helicoidal spring 5 biases it against the shell 2 (in FIG. 1 the shell and the two end caps are shown spaced apart for better visibility of the components). The shell 2 has a truncated conical surface 6 at each of its ends while the end caps 3 and 4 have a truncated conical surface 7, the conicity angle of which is equal to that of surface 6. The conicity angle is preferably relatively large in order to avoid the phenomena of jamming or binding of the male cone (of the shell) in the female cone (of the end caps 3 and 4). This angle depends on the coefficients of friction of the materials present. For example, it could be an angle of about 70° for a steel/vitreous fused silica interface.

This roller is accompanied by the shortcomings mentioned above, i.e., the fact that the contact zone between each of the end caps 3 and 4 and the shell 2 is reduced almost to a point zone when the shaft 1 flexes under load.

Figure 2:
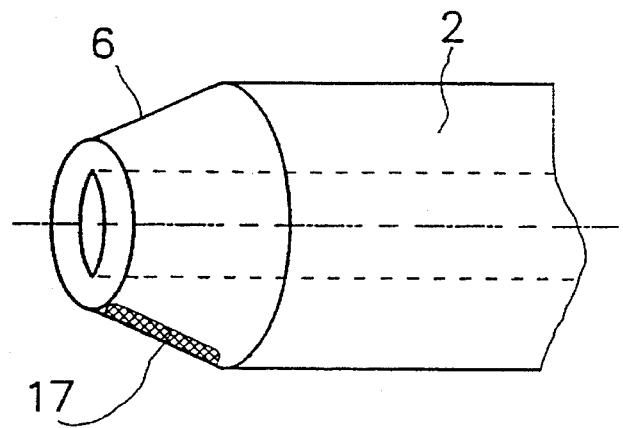
FIG. 2 illustrates the contact zone between the shell and an end cap in the case of a roller of the type shown in FIG. 1.

The contact surface zone between the shell (or a solid roller) and an end cap in the case of the FIG. 1 prior art roller is shown in FIG. 2. It is evident that this zone 17, of small width, is distributed on all sides of a generatrix of the truncated conical surface 6 of the shell 2. This arises from the fact that the diameter of the truncated conical part of the shell 2 is necessarily slightly less than the internal diameter of the end caps 3 and 4 (not shown in FIG. 2) and also from the fact that the end cap is deformed very little because it is solid. It is understood that a slight defect in alignment of the end cap with respect to the roller sharply reduces the area of the contact zone 17 to a point zone.

Figure 3:
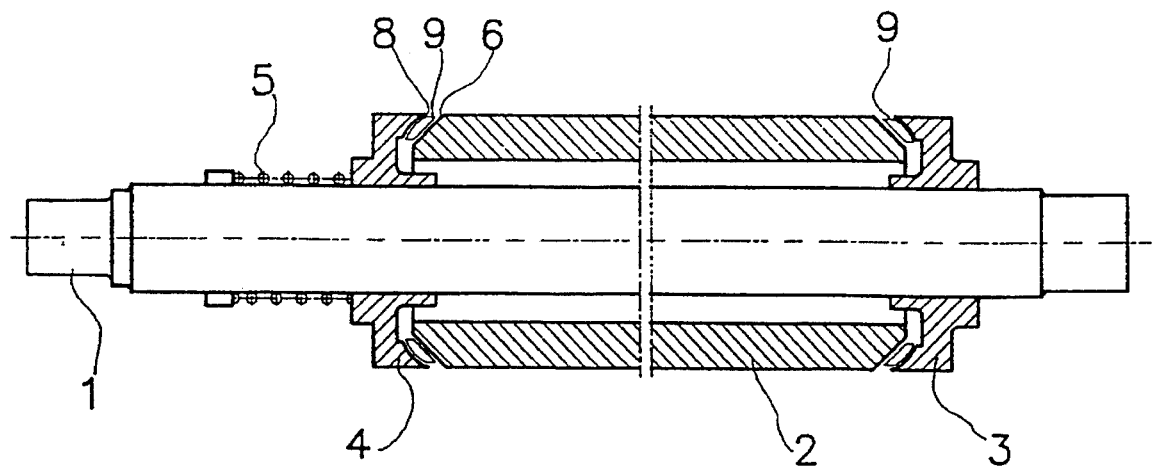
FIG. 3 is a partial cutaway view of a first embodiment of a roller according to the invention.

FIG. 3 shows a roller according to the invention that makes it possible to remedy the shortcomings of the roller described in reference to FIG. 1. The pieces numbered from 1 to 7 are identically present. However, the end caps 3 and 4 are modified to present spherical bearing surfaces 8 instead of truncated conical surfaces 7. The presence of an intermediate piece 9 placed between the shell 2 and each of the end caps 3 and 4 is also noted. Each of the pieces 9 have the form of a collar or ring. The face of the pieces turned toward the end caps 3 and 4 has a spherical bearing surface of the same radius of sphericity as the surfaces 8 of the end caps 3 and 4. The faces of the pieces 9 directed toward the shell 2 have a truncated conical bearing surface of the same conicity as the surfaces 6 of the shell 2. The centers of the ball-and-socket joints are spaced in order to define a precise position of the axis of the roller.

When the shaft 1 flexes under load, the area of the contact zone between the intermediate piece 9 and the spherical bearing surface 8 of the end caps 3 and 4 is displaced so as to maintain the area of the contact zone surface constant.

FIGS. 4 through 6 illustrate other embodiments of the invention. In FIG. 4 there is no intermediate piece 9 between the end caps and the shell. A spherical bearing surface 11 is formed directly on the shell 2. In FIG. 5 an intermediate piece 12 is provided that has truncated conical and spherical faces reversed relative to piece 9. Its truncated conical face is directed toward the end caps 3 and 4 while the spherical face is directed toward the shell 2.

The intermediate pieces 9, 12 have a small width and thickness relative to their diameters. This facilitates changing the orientation of the contact zone. In effect, because the intermediate piece has a small width, it can be readily deformed elastically to adapt to the contour of the end of the shell. FIG. 7 shows the bearing surface zone (or contact zone) 19 of the shell 2 (or of a solid roller) on an end cap in the case of a roller according to the invention in particular in the case of the use of an intermediate piece such as 9, 12. Zone 19 is distributed along an arc of a straight section of the truncated conical part 6 of the shell 2 through a plane perpendicular to the longitudinal axis of the roller. This arc of a circle is defined by an angle α originating at the axis of rotation of the cylindrical shell. The value of the angle α depends on the flexibility of the intermediate piece 9, 12. Given that the width and thickness of such a piece are relatively small, it is deformed under load and conforms to the shape of the shell along an arc subtending an angle α. It is assumed that in the case of a variation in alignment between the end cap and the shell, the surface of the contact zone 19 is reduced very little. Given that the contact zone does not decrease when the shaft 1 flexes under load, as is the case in the prior art, it is no longer necessary to overdimension the thickness of the shell to compensate for point contact stresses. A decrease in the weight of the latter results.

Due to the reduction in thickness of the shell 2, the support surface of the bearing 10 on the shaft 1 can be readily distributed on all sides of the plane of application of the load exerted on the end cap 4, i.e., the weight of the shell 2 itself, augmented by the load transported by the latter. The jamming or clamping effect that could be observed in the prior art due to an uncertain support is thus avoided.

FIG. 8 shows another embodiment in which the ball-and-socket joint is obtained not between the shell and the end cap, but between the end cap and the shaft 1. A ring 20 is mounted on the shaft 1 for this. It has a spherical surface 22. The center of the sphere is located on the longitudinal axis 24 of the shaft 1. The end cap 4 can thus pivot around the center O, effecting a ball-and-socket joint. The intermediate piece 9, 12 is preferably of a material having a good coefficient of metal/metal friction, e.g., copper.

FIG. 6 shows a variation of the invention in which the ball-and socket joint is obtained by a spherical surface 15 formed on the shell, supported on a truncated conical surface 16 of the end cap.

FIG. 9 shows a final embodiment in which the shell 2 is solid and not hollow. Consequently, there is no shaft passing through such as the shaft 1 shown in FIGS. 1 through 8. Instead, each end cap 3, 4 is mounted on a shaft 1a, 1b. The end cap 3 is fixedly mounted on the shaft 1a. The end cap 4 is slidably mounted on the shaft 1b. It is forcefully engaged against the shell 2 by a spring 5.

What is claimed:

1. Roller comprised of a shell of refractory material, rotatable about an axis, said shell having two ends and a bearing surface defined at each of these ends, two end caps mounted rotatably on at least one shaft at each of the ends of said shell and rotatable about the same axis as said shell, and receiving the bearing surfaces of the shell along a contact zone, these end caps being of a material having a higher coefficient of expansion than that of the refractory material of the shell, and a spherical joint means at each of the ends of the shell for preventing a decrease of said contact zone between said bearing surfaces and said end caps despite thermal differential expansion between said roller and end caps and flexing of said shell under load, said joint means including first and second joint members, each of which has a spherical surface that engages the other, said contact zone being defined at the inter-engagement between said spherical surfaces.

2. Roller according to claim 1, wherein the shell is hollow and wherein said shaft is a single shaft that passes through the said shell.

3. Roller according to claim 1, wherein one of the end caps is fixedly mounted to said shaft and the other end cap is slidably mounted on a shaft, and further comprising a resilient means for pressing the slidably mounted end cap against a bearing surface of said shell.

4. Roller according to claim 1, wherein the spherical joint means are provided between the shell and the end caps.

5. Roller according to claim 2, wherein the spherical joint means are provided between the shaft and the end caps.

6. Roller according to claim 4, wherein each of the spherical joint means includes an intermediate piece mounted on one of said bearing surfaces of the shell and placed between the shell and one of the end caps.

7. Roller according to claim 6, wherein the intermediate piece of each joint means has a spherical surface that is supported on the bearing surface of the shell.

8. Roller according to claim 6, wherein the intermediate piece of each joint means has a spherical surface that is supported on a spherical bearing surface of the end caps.

9. A roller according to claim 6, wherein the intermediate piece is made of copper.

10. Roller according to claim 6, wherein the intermediate piece is a ring or collar of small width and thickness relative to its diamter.

* * * * *